(12) United States Patent
Wei et al.

(10) Patent No.: US 10,802,603 B2
(45) Date of Patent: Oct. 13, 2020

(54) COMPUTING DEVICE ACCESSORIES WITH RETENTION CUPS

(71) Applicant: HEWLETT-PACKARD DEVELOPMENT COMPANY, L.P., Spring, TX (US)

(72) Inventors: Duan Wei, Shanghai (CN); Chia-Ming Tsai, Taipei (TW); Cheng-Han Tsai, Taipei (TW); Wen-Yen Tang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/335,834

(22) PCT Filed: Nov. 10, 2016

(86) PCT No.: PCT/US2016/061359
§ 371 (c)(1),
(2) Date: Mar. 22, 2019

(87) PCT Pub. No.: WO2018/089007
PCT Pub. Date: May 17, 2018

(65) Prior Publication Data
US 2020/0026363 A1    Jan. 23, 2020

(51) Int. Cl.
*G06F 1/16* (2006.01)
*G06F 3/02* (2006.01)
*G06F 3/0354* (2013.01)

(52) U.S. Cl.
CPC .......... *G06F 3/0202* (2013.01); *G06F 1/1626* (2013.01); *G06F 1/1632* (2013.01); *G06F 3/03547* (2013.01)

(58) Field of Classification Search
CPC ..... G06F 1/1626; G06F 1/1628; G06F 1/1632
USPC ........................................ 361/679.17, 679.56
See application file for complete search history.

(56) References Cited

U.S. PATENT DOCUMENTS

| 8,199,496 | B2* | 6/2012 | Liu ..................... E05C 19/00 312/223.1 |
| 8,488,314 | B1* | 7/2013 | Ashcraft ............... G06F 1/1679 312/223.1 |
| 8,681,492 | B2 | 3/2014 | Fan |
| 8,824,136 | B1* | 9/2014 | Interian, III .......... G06F 1/1632 345/168 |
| 8,896,541 | B2 | 11/2014 | Huang |
| 9,342,107 | B2 | 5/2016 | MacDonald |

(Continued)

FOREIGN PATENT DOCUMENTS

| JP | 0893743 | 4/1996 |
| KR | 20110027951 A | 3/2011 |

OTHER PUBLICATIONS

Tablet Keyboard Case Buying Guide—Choosing the Right, 2016, < http://www.kensington.com/us/us/4721/tablet-keyboard-case-buying-guide-choosing-the-right-keyboard-case#,V1 Db7t94dU >.

*Primary Examiner* — Anthony Q Edwards
(74) *Attorney, Agent, or Firm* — HP Inc. Patent Department

(57) ABSTRACT

In an example, a computing device accessory may include a components such as a computing device cover, an attachment portion engageable with a computing device, and a retention cup disposed on the computing device cover to attach to a computing device surface of the computing device through suction pressure.

13 Claims, 5 Drawing Sheets

(56) References Cited

U.S. PATENT DOCUMENTS

| | | | | |
|---|---|---|---|---|
| 9,823,701 B2* | 11/2017 | MacDonald | ......... | G06F 1/1654 |
| 2006/0017699 A1* | 1/2006 | Brown | ................. | G06F 40/232 |
| | | | | 345/168 |
| 2006/0133019 A1 | 6/2006 | Yamazaki et al. | | |
| 2014/0267050 A1* | 9/2014 | Spollen | ................ | G06F 3/0219 |
| | | | | 345/168 |
| 2015/0098182 A1* | 4/2015 | Liu | ...................... | G06F 1/1681 |
| | | | | 361/679.55 |
| 2015/0153783 A1 | 6/2015 | Corbin et al. | | |
| 2015/0341711 A1* | 11/2015 | Chen | ....................... | H04R 1/02 |
| | | | | 381/333 |
| 2016/0029760 A1* | 2/2016 | Park | ...................... | A45C 11/00 |
| | | | | 224/242 |
| 2016/0187921 A1* | 6/2016 | Shriver | .................. | F16B 47/00 |
| | | | | 108/42 |

* cited by examiner

COMPUTING DEVICE ACCESSORIES WITH RETENTION CUPS

BACKGROUND

Computing devices may be portable. Computing devices may include accessories to protect or assist in protecting the computing device while it is being transported or carried in a portable manner. Further, computing devices may include accessories that fold, hinge, or bend over or around the computing device to help protect the computing device and make the computing device more compact and portable.

DETAILED DESCRIPTION

Figure 1:
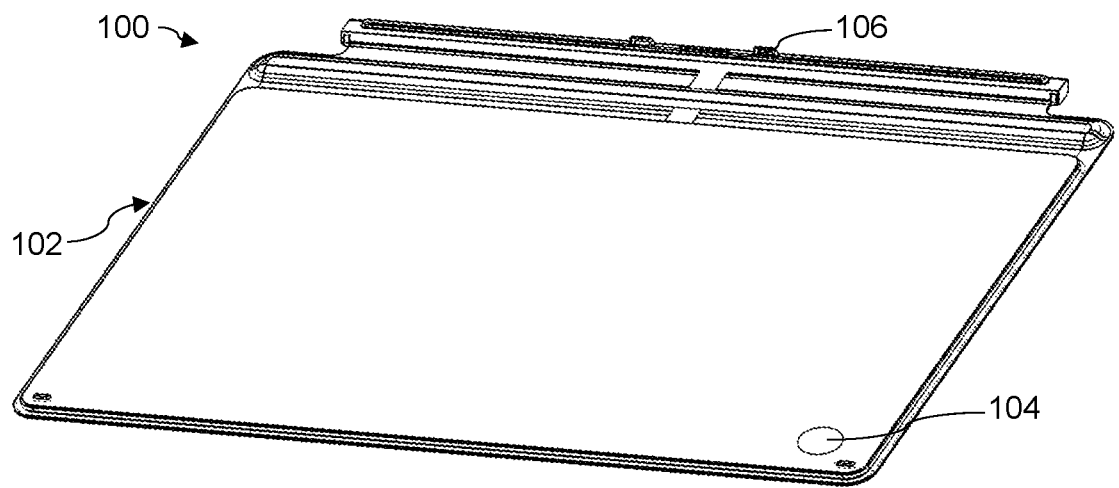
FIG. 1 is a perspective view of an example computing device accessory.

Devices such as electronic devices, or computing devices, for example, may be portable, or may be carried or transported by a user when not in use. Additionally, computing devices may include accessories to protect or assist in protecting the computing device while it is being transported or carried in a portable manner. Further, computing devices may include accessories that fold, hinge, or bend over or around the computing device to help protect the computing device and make the computing device more compact and portable. In some situations, an accessory being used with a computing device may fold over the computing device in a closed position in order to protect the computing device, and/or a screen or display thereof, when the computing device is not being operated by a user.

It may be desirable, in some situations, to retain an accessory, such as a cover, for example, to the computing device while the accessory is in a closed position with the computing device and thereby covering and/or protecting the computing device. The ability to retain such an accessory may enable a user to carry or transport the computing device without having the accessory fall from the closed position, or otherwise expose the computing device, and/or a screen or display thereof, to possible scratching, scrapes, or other types of damage that may otherwise be prevented by the accessory. Similar accessories, in some situations, may include a mechanical latch to hold or retain the accessory in the closed position. Further, in other situations, similar accessories may include a magnetic component or latch to magnetically hold the accessory in the closed position.

In some situations, such solutions may invite further disadvantages. A mechanical latch may add unnecessary complexity and cost to the accessory and/or the computing device due to adding more parts and components, and therefore additional failure and/or breakage points. Additionally, employing a magnetic latch in the accessory to magnetically hold the accessory to the computing device in the closed position may invite electromagnetic interference or disruption by the magnetic latch components with electrical or electromagnetic functions of the computing device. Further, a magnetic latch may not be a reliably secure retention component. The magnetic latch in the accessory may be aligned with other magnetic components in the computing device to hold the accessory in the closed position, and it may be easy to inadvertently or accidentally bump or otherwise misalign the magnetic latch with the complementary components, thereby causing the accessory to fall from the closed position while the computing device is being carried or transported, exposing the computing device to potential damage.

Implementations of the present disclosure provide examples of computing device accessories that are removable and movable between an open position and a closed position with a computing device. Additionally, implementations of the present disclosure provide computing device accessories having a retention component to reliably and securely hold such an accessory in the closed position with the computing device. Further, implementations of the present disclosure may provide computing device accessories that add a minimal amount of additional parts and components to employ such a retention component, and the retention component may not have to rely on a correct alignment with the computing device in order to reliably hold the computing device accessory in the closed position with the computing device.

Referring now to FIG. 1, a perspective view of an example computing device accessory 100 is illustrated. The example computing device accessory 100 may include a computing device cover 102, an attachment portion 106 engageable with a computing device, and a retention cup 104 disposed on the computing device cover 102 to removably attach to a computing device surface of the computing device through suction pressure.

Figure 2A:
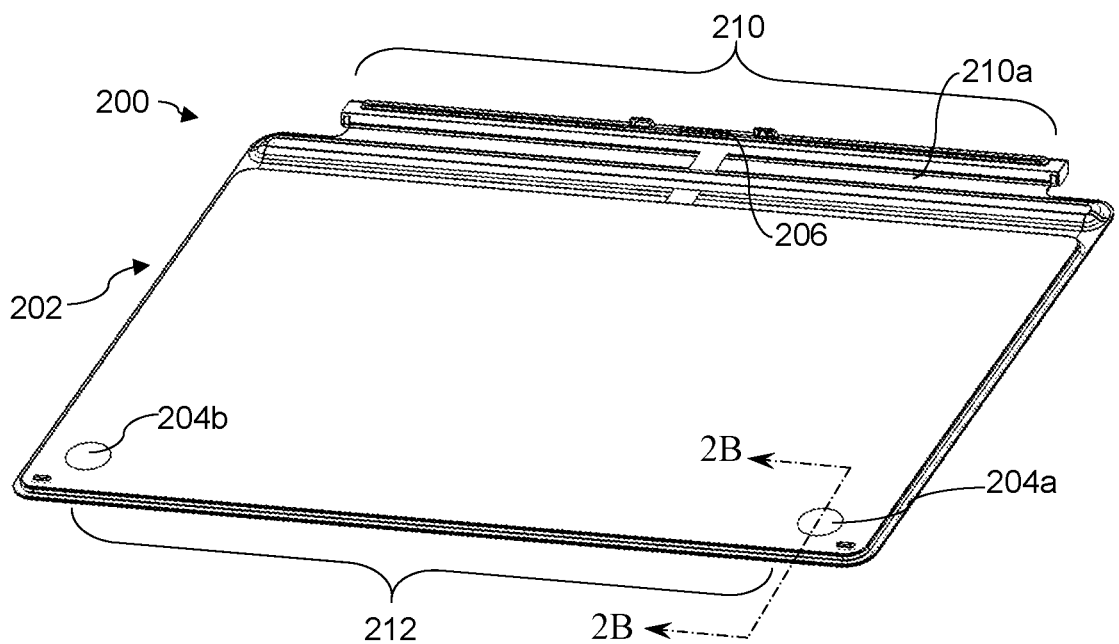
FIG. 2A is a perspective view of an example computing device accessory.

Referring now to FIG. 2A, a perspective view of an example computing device accessory 200 is illustrated. Example computing device accessory 200 may be similar to example computing device accessory 100. Further, the similarly named elements of example computing device accessory 200 may be similar in function and/or structure to the elements of example computing device accessory 100, as they are described above. Example computing device accessory 200 may include an attachment portion 206, a computing device cover 202, and a first retention cup 204a.

The computing device cover 202 may be a rigid, semi-rigid or semi-flexible, or a flexible or soft cover suitable to cover a computing device. The computing device cover 202 may include materials such as rubber, leather, felt, cotton, or other materials that may enable the computing device cover 202 to protect and avoid damage to a computing device on which the cover 202 may be disposed. Additionally, the computing device cover 202 may be sized sufficiently to span a specific computing device, or a display or screen thereof, or, in other implementations, may be sized sufficiently so as to appropriately cover and protect a variety or range of different computing devices. In some implementations, the computing device cover 202 may be substantially flat, or flat enough to lie on top of an intended surface to be covered on a computing device. In further implementations, the computing device cover 202 may be a single unitary component or sheet, or, in other implementations, may include two or more partitions or sections that may be bendable or movable relative to one another. These partitions or sections may enable the computing device cover 202 to cover an angled, curved, or otherwise uneven surface of a computing device. Such partitions or sections may also enable the computing device accessory 200, and/or the computing device cover 202 thereon, to easily transition from an open position with the computing device, to a closed position with the computing device, and vice versa. Such open and closed positions are discussed in further detail below.

The computing device accessory 200 may include a first retention cup 204a disposed on the computing device cover 202. In some implementations, first retention cup 204a may be a component that is able to attach to a surface and hold on to the surface using negative pressure, or, in other words, suction pressure, by having air disposed in between the retention cup 204a and the surface evacuated, creating a vacuum. In further implementations, the computing device accessory 200 may include a second retention cup 204b. The second retention cup 204b may be similar in structure and/or function to the first retention cup 204a, and may also be disposed on the computing device cover 202. In yet further implementations, the computing device accessory 200 may include additional retention cups 204c, 204d, . . . 204n (not shown) which may also be similar to the first and/or second retention cups 204a and 204b, and may also be disposed on the computing device cover 202.

Figure 2B:
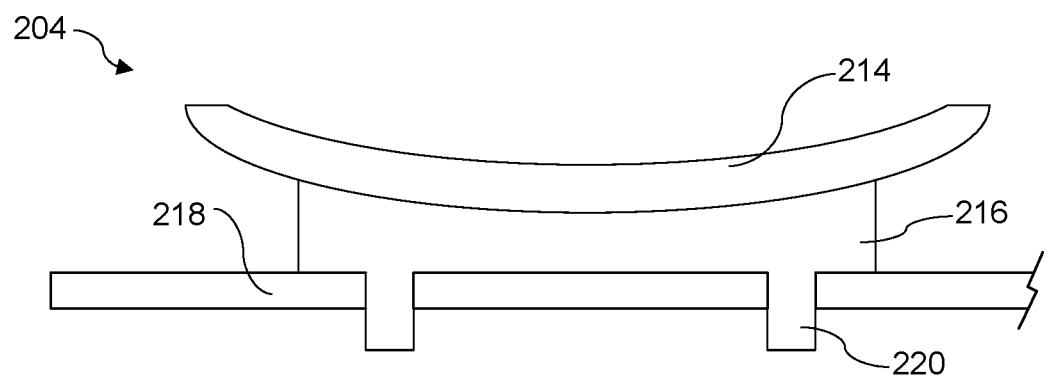
FIG. 2B is a cross-sectional view of an example computing device accessory.

Referring additionally to FIG. 2B, a cross-sectional view of the first retention cup 204a taken along view line 2B-2B of FIG. 2A is illustrated. The illustration of the retention cup in FIG. 2B may be representative of any of the retention cups 204a-204n. In some implementations, the first retention cup 204a may include a suction portion 214 and an assembly portion 216. The suction portion 214 may be a gas impermeable member such that gas may not pass through the material constituting the suction portion 214. The suction portion 214 may be formed, at least partially, from rubber, plastic, silicon, polymer, or another gas-impermeable material. In some implementations, the suction portion 214 may have a conical geometry, a semi or hemi-spherical geometry, or another geometry that, when the suction portion 214 is compressed against another gas-impermeable surface, air may be evacuated from within the suction portion 214 such that the suction portion 214 is held to or attached to the other gas-impermeable surface through negative pressure or suction pressure. In some implementations, the suction portion 214 may be a suction cup.

The assembly portion 216 may be a member or component that assembles or attaches the suction portion 214 to another component or substrate 218. In the illustrated example, the substrate 218 may represent a portion or deck of the computing device cover 202. In some implementations, the assembly portion 216 may attach the suction portion 214 to the substrate 218 through injection molding, wherein the assembly portion 216, in a liquid, partial-liquid, or otherwise malleable form, may be injected into an orifice of the substrate 218, and then cooled or hardened such that a post 220 of the assembly portion 216 is retained within the substrate 218. In some implementations, the assembly portion 216 may be injection molded into more than one orifice, as illustrated in FIG. 2B, resulting in more than one post 220 retained within the substrate. It should be noted that any number of posts 220 may attach the retention cup to the substrate, and the posts 220 may have geometries or shapes other than as illustrated. In some implementations, the assembly portion 216 may be attached to the suction portion 214 either before or after the injection process. In further implementations, the assembly portion 216 is attached to the suction portion 214 by glue, epoxy, or another adhesive, or by a mechanical engagement. In yet further implementations, the suction portion 214 and the assembly portion 216 may be a unitary component, and may be both formed and attached to the substrate by an injection molding process. In some implementations, the assembly portion 216 may include a hot-melt adhesive.

Referring again to FIG. 2A, in some implementations, the computing device cover 202 may have a hinge side 210 and a free side 212. The hinge side 210 may be a side or edge of the computing device cover 202 upon which the attachment portion 206 may be disposed. The free side 212 may be an opposite side or edge from the hinge side 210, and, in some implementations, the first retention cup 204a and/or additional retention cups may be disposed on or along the free side 212. The hinge side 210 may include a hinge 210a which may enable the computing device accessory 200, or the computing device cover 202 thereof, to rotate, pivot, or otherwise move between the open position and the closed position. In some implementations, the hinge 210a may be a mechanical hinge, such as the type having a barrel and an axle, for example, or, in other implementations, the hinge 210a may be of another type. For example, the hinge 210a may be a bendable piece of leather, rubber, fabric, polymer, or another material, in some implementations, and as illustrated in FIG. 2A.

The attachment portion 206 may be a rigid or semi-rigid member that may be engageable with the computing device. More specifically, in some implementations, the attachment portion 206 may be engageable with a complementary attachment portion of the computing device. The attachment portion 206 may removably attach to the computing device—such that the computing device accessory 200 is user-attachable and user-detachable, or, in other words, easy, quick, or simple to install and remove. Thus, a user, upon desiring to use the computing device accessory, may easily attach the attachment portion 206 to the computing device. Similarly, upon desiring to use the computing device separately, the user may easily detach the computing device accessory 200 from the computing device. The attachment portion 206 may attach to the computing device, or the complementary attachment portion thereof, by a user-actuatable mechanical latch, in some implementations. In further implementations, the attachment portion 206 may attach to the computing device though a magnetic connection, or through another way, for example, using mechanical fasteners. In yet further implementations, the attachment portion 206 may attach to the computing device by engaging with communication ports or other attachment components of the computing device.

The hinge 210a may be disposed in between the attachment portion 206 and the rest of the computing device cover 202, such that the attachment portion 206 may be rigidly attached to the computing device, and the hinge 210a, therefore, may enable the computing device cover 202 to rotate or pivot relative to the computing device, about the attachment portion 206, between the open and closed positions.

Figure 3A:
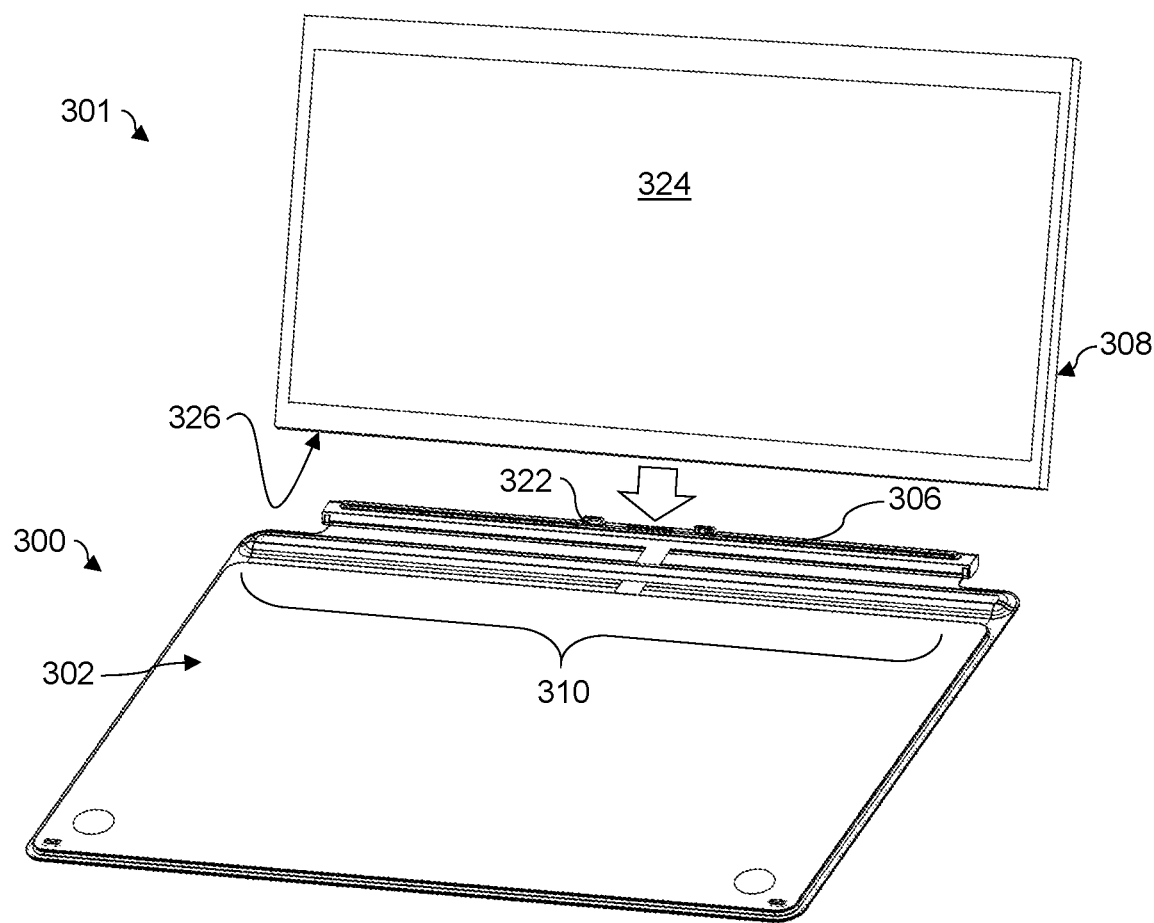
FIG. 3A is a perspective exploded view of an example computer system having an example computing device accessory.

Referring now to FIG. 3A, a perspective view of an example computer system 301 having an example computing device accessory 300 is illustrated. Example computing device accessory 300 may be similar to above-described example computing device accessories. Further, the similarly named elements of example computing device accessory 300 may be similar in function and/or structure to the elements of other example computing device accessories, as they are described above. The example computer system 301 may include a computing device accessory 300 and a computing device 308. The computing device 308 may be a device having computer components, which may include processors, memory, storage drives, power supplies, batteries, operating systems, input/output (I/O) and/or communication ports, and other components suitable for use in a computing device. Additionally, the computing device 308 may be capable of executing machine-readable instructions stored in a memory of the computing device 308. In further implementations, the computing device 308 may include a display or screen 324, upon which a graphical user interface, or other graphical material may be displayed. In some implementations, the computing device 308 may be a tablet computer which, in some situations, may be referred to as a slate.

In some implementations, the computing device accessory 300 may include an attachment portion 306 disposed on a hinge side 310 of a computing device cover 302 of the computing device accessory 300, the attachment portion 306 to be engaged with a complementary attachment portion disposed along a first side 326 of the computing device 308. The attachment portion 306 may engage with the complementary attachment portion of the computing device 308 such that the computing device accessory 300 may be assembled on to or attached to the computing device 308 in a manner similar to that shown in FIG. 3A. The attachment portion 306 may include an assembly post 322 to be received by a complementary assembly receptacle on the first side 326 of the computing device 308 to aid in the attachment of the computing device accessory to the computing device 308. In further implementations, the attachment portion 306 may include multiple assembly posts 322, which may or may not have similar structure to one another, the multiple assembly posts 322 to each be received by a complementary receptacle or other type of geometry on the first side 326 of the computing device 308. In other implementations, the attachment portion 306 may attach to or engage with another portion of the computing device 308, such as a front surface, for example.

Figure 3B:
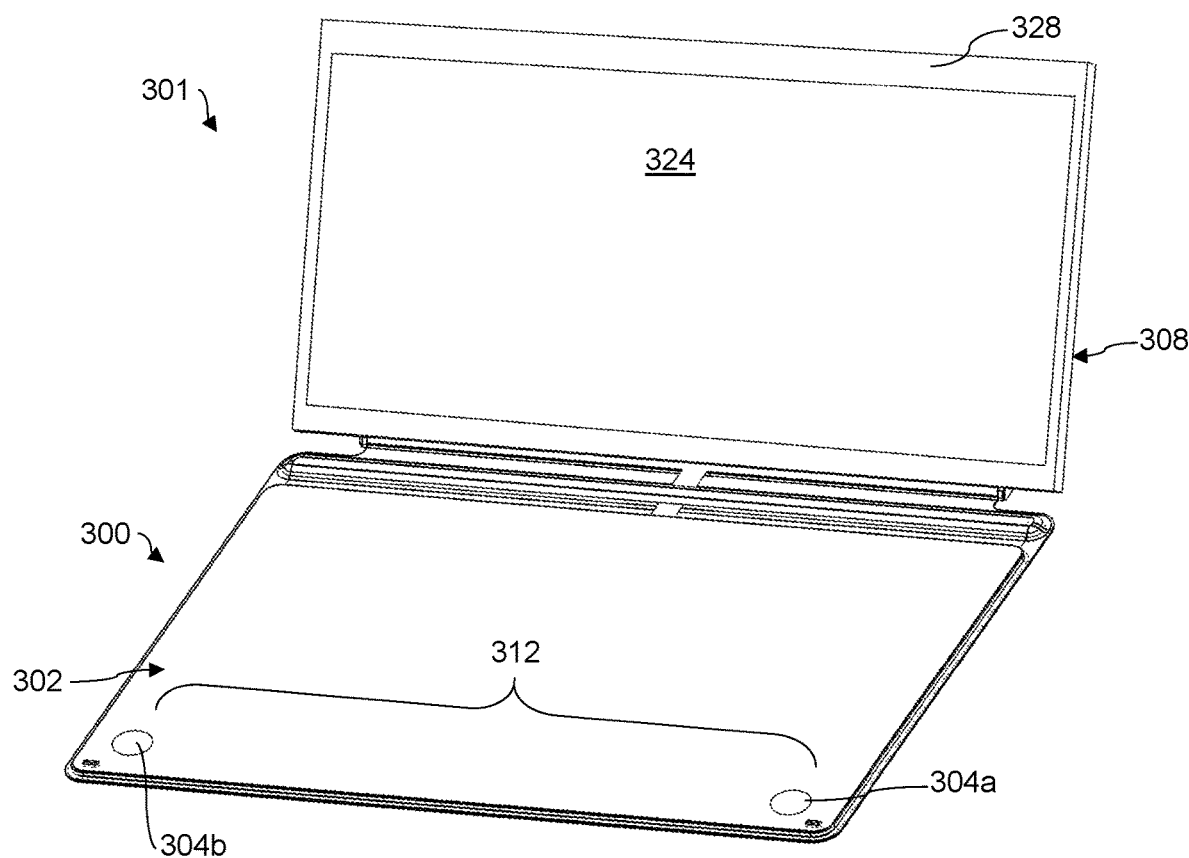
FIG. 3B is a perspective view of an example computer system having an example computing device accessory.

Referring now to FIG. 3B, a perspective view of the example computer system 301 is illustrated, wherein the computing device accessory 300 and the computing device 308 are assembled on to one another, and the computing device accessory 300 is disposed in an open position with the computing device 308. The computing device accessory 300 may be movable between the open position and a closed position when the computing device accessory 300 is engaged with, or attached to the computing device 308. While the computing device accessory 300 and the computing device 308 are disposed in the open position, a user may engage with, use, or otherwise interact with the computing device 308, the display 324, or another component thereof. The computing device accessory 300 may include a first and second retention cup 304a and 304b, which may be disposed on a free side 312 of the computing device cover 302, wherein the free side 312 is opposite from the hinge side 310, in some implementations. In other implementations, the first and second retention cups 304a, 304b, may be disposed on another side or edge of the computing device cover 302. In some implementations, the first retention cup 304a and the second retention cup 304b may be disposed in adjacent corners of the computing device cover 302 such that the first and second retention cups 304a, 304b, may each attach to a respective adjacent corner of a top computing device surface 328 when the computing device accessory 300 is in the closed position with the computing device 308. In other implementations, the first and second retention cups 304a, 304b may attach to other portions of the computing device surface 328 to hold the computing device accessory 300 in the closed position.

Figure 3C:
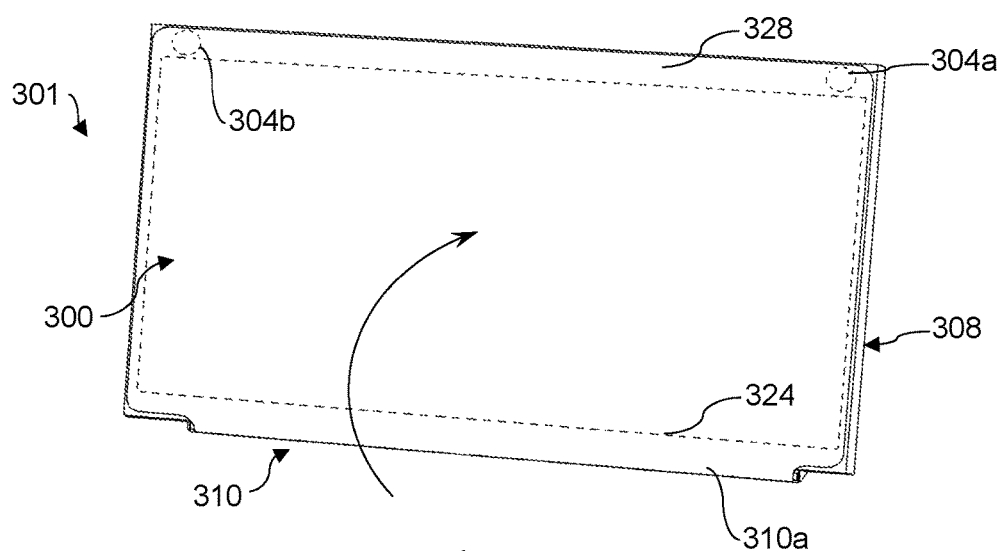
FIG. 3C is a perspective view of an example computer system having an example computing device accessory.

Referring now to FIG. 3C, a perspective view of the example computer system 301 is illustrated wherein the computing device accessory 300 is disposed in a closed position with the computing device 308. In some implementations, in order to transition from the open position to the closed position, the computing device accessory 300 may rotate or pivot about the attachment portion 306 (hidden in FIG. 3C) by way of a hinge 310a disposed on the hinge side 310. The computing device accessory 300 may rotate or pivot about the hinge 310a, in a manner similar to that shown, until the computing device accessory 300, or the computing device cover 302 thereof, is covering or otherwise protecting the computing device 308 in the closed position. In some implementations, the computing device cover 302 may span the display 324, or a display surface thereof, when disposed in the closed position with the computing device. It should be noted, the display 324 is shown in phantom lines in FIG. 3C, as it is being covered and/or hidden by the computing device cover 302. Once covering the computing device 308, and/or the display 324 thereof, the user may further push the computing device cover 302 against the computing device 308 so as to push the air disposed in between the first and/or second retention cups 304a, 304b and the computing device surface 328 out, thereby creating a vacuum seal or a negative or suction pressure between the retention cups and the computing device surface 328. Such a negative or suction pressure enables the first and second retention cups 304a, 304b to hold the computing device accessory 300 to the computing device in the closed position in a secure and reliable manner.

The computing device surface 328, in some implementations, may be a front facing surface. In other words, the computing device surface may face the same direction as the display 324. In further implementations, the computing device surface 328 may be a portion of a bezel of the display 324, and, in yet further implementations, may be a surface of a second side of the computing device, opposite from the first side. In other words, the first retention cup 304a and the second retention cup 304b may each attach to a bezel of the display 324 of the computing device 308. The first retention cup 304a may hold the computing device accessory 300, or the computing device cover 302 thereof, in the closed position through suction pressure when attached to the computing device surface 328. As such, in some implementations, the computing device surface 328 may be a gas-impermeable surface, or, capable of holding the suction pressure between the first retention cup 304a and the computing device surface 328. In further implementations, the second retention cup 304b may function similar to the first retention cup 304a, and removably attach to or engage with the computing device surface 328 of the second side of the computing device 308 so as to hold the computing device accessory in the closed position though suction pressure. In order to detach the first and/or second retention cups from the computing device surface 328, a user may pull on the computing device cover 302 with sufficient force to break the air-tight seal between the retention cups and the computing device surface 328. A user may also peel an edge of the retention cup away from the computing device surface 328 until the air-tight seal is broken, and the suction pressure is released. While illustrated as a continuous surface, the computing device surface 328 may include multiple surfaces, or, in other words, each retention cup may hold on to a different computing device surface through suction pressure. Additionally, it should be noted that the first and second retention cups 304a, 304b, as well as the computing device surface 328 are shown in phantom lines in FIG. 3C, as they are being covered and/or hidden by the computing device cover 302.

Figure 4A:
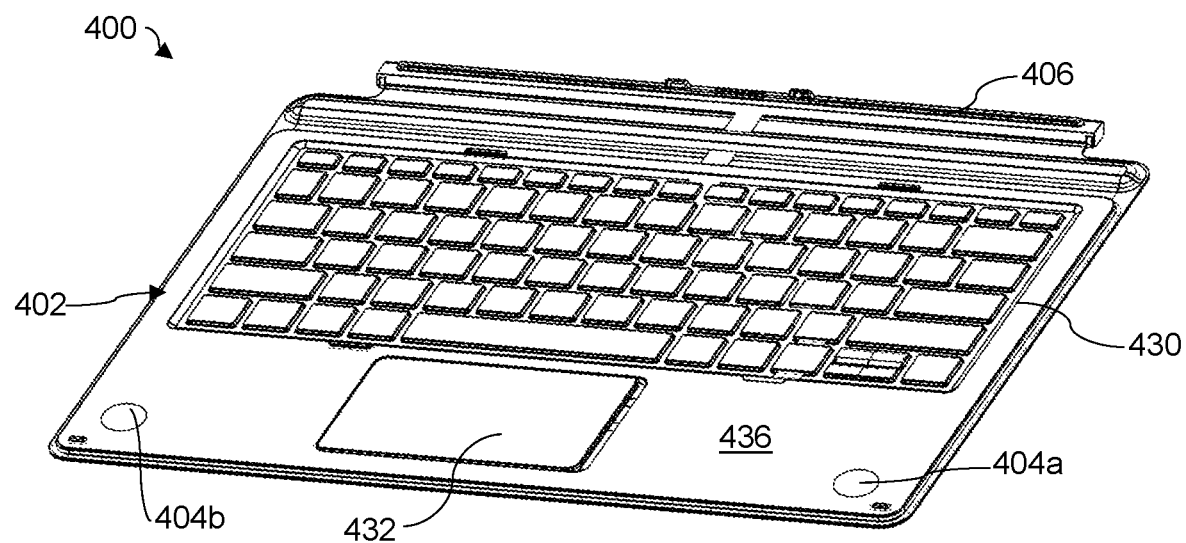
FIG. 4A is a perspective view of an example computing device accessory.

Referring now to FIG. 4A, a perspective view of an example computing device accessory 400 is illustrated, wherein the computing device accessory 400 is a removable keyboard 400. Example removable keyboard 400 may be similar to above-described example computing device accessories. Further, the similarly named elements of example removable keyboard 400 may be similar in function and/or structure to the elements of other example computing device accessories, as they are described above. The removable keyboard 400 may include an attachment portion 406 to be removably engaged, or engageable with a complementary attachment portion of a computing device. The removable keyboard 400, or the attachment portion 406 thereof, may removably attach to an edge of the computing device, and the removable keyboard 400 may be movable between a closed position and an open position with the computing device. The removable keyboard 400 may also include a keyboard portion 402, and a first retention cup 404a and a second retention cup 404b, each retention cup disposed on the keyboard portion 402 to removably attach to a computing device surface through suction pressure when the removable keyboard is in the closed position with the computing device. In some implementations, the first and/or second retention cup 404a, 404b, disposed on the keyboard portion 402 may removably attach to a front facing surface of the computing device through suction pressure, the retention cups to hold the removable keyboard 400 in the closed position when attached to the front facing surface.

The keyboard portion 402 may, in some implementations, be similar in structure and/or function to the above-described computing device covers. In further implementations, the keyboard portion 402 may include a keyboard 430, and/or various keyboard components. The keyboard portion 402, or the keyboard 430 thereof, may receive user input when the removable keyboard 400 is in the open position with the computing device. Further, in some implementations, the removable keyboard 400 may include a track pad 432 disposed on the keyboard portion 402. The track pad 432 may also receive user input when the removable keyboard 400 is in the open position.

The removable keyboard 400 may include a keyboard deck 436 on the keyboard portion 402. The keyboard deck 436 may refer to a top surface of the keyboard portion 402 upon which the keyboard 430, the track pad 432, and the first and second retention cups 404a, 404b may be disposed. In some implementations, the keyboard deck 436 may include a substrate similar to substrate 218 illustrated in FIG. 2B. In some implementations, the first retention cup 404a and the second retention cup 404b may be injection molded into the keyboard deck 436 of the keyboard portion 402. It should be noted that although only a single portion of the keyboard deck 436 is annotated in FIG. 4A, the keyboard deck 436 may include multiple similar surfaces throughout the keyboard portion 402.

Figure 4B:
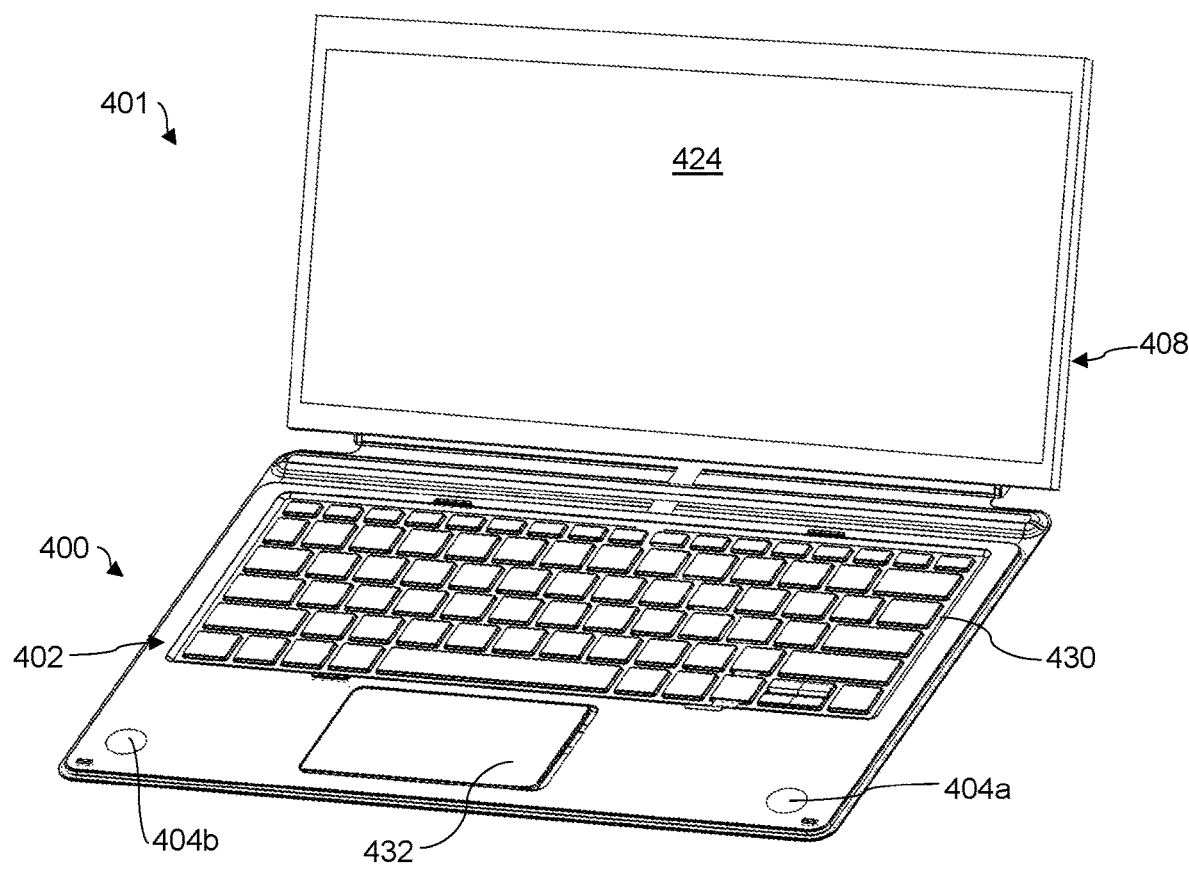
FIG. 4B is a perspective view of an example computer system having an example computing device accessory.

Referring now to FIG. 4B, a perspective view of an example computer system 401 is illustrated, wherein the removable keyboard 400 and an example computing device 408 are removably attached and disposed in the open position with one another. When in this configuration, the computing device 408 and/or the removably keyboard 400 may receive user input. For example, in some implementations, a user may type or otherwise actuate the keyboard to interact with the computing device 408, or an application or machine-readable instructions being executed thereon. In some implementations, the removable keyboard 400, or the attachment portion 406 thereof, may mechanically and/or electrically attach to the computing device 408 through an I/O port or another communication port of the computing device 408. Thus, the removable keyboard 400 may receive user input from the keyboard 430 and/or the track pad 432, and transfer or otherwise communicate such input to the computing device 408 through such a communication port. In other words, the removable keyboard 400 may operably engage with the computing device 408 through a communication port on the computing device 408 if the removable keyboard 400 is attached to the computing device 408. In other implementations, the removable keyboard 400 may operably engage with the computing device 408 through a wireless communication protocol, for example, Bluetooth, Wi-Fi, or another wireless communication protocol, if the removable keyboard 400 is attached to the computing device 408.

What is claimed is:

1. A computing device accessory, comprising:
   an attachment portion engageable with a computing device on a hinge side of the computing device accessory, wherein the attachment portion allows the computing device accessory to be coupled and decoupled from the computing device;
   a computing device cover to cover a display of the computing device when the computing device accessory is in a closed position; and
   a retention cup disposed on the computing device cover along a free side of the computing device cover to attach to a computing device surface that is adjacent to the display through suction pressure when the computing device accessory is in a closed position, wherein the free side is opposite to the hinge side.

2. The computing device accessory of claim 1, wherein the computing device accessory is movable between an open position and the closed position when the computing device accessory is engaged with the computing device, the retention cup to hold the computing device accessory in the closed position when attached to the computing device surface.

3. The computing device accessory of claim 2, wherein the computing device cover is to span a display surface of the computing device when disposed in the closed position with the computing device.

4. The computing device accessory of claim 2, wherein the attachment portion is disposed on a hinge side of the computing device cover, the attachment portion to be engaged with a complementary attachment portion disposed along a first side of the computing device.

5. The computing device accessory of claim 1, wherein the computing device is a tablet computer.

6. A removable keyboard, comprising:
   an attachment portion to be engaged with a complementary attachment portion of a computing device on a hinge side of the computing device, wherein the attachment portion allows the removable keyboard to be coupled and decoupled from the computing device;
   a keyboard portion to cover a display of the computing device when the removable keyboard is in a closed position; and
   a first retention cup and a second retention cup each disposed on the keyboard portion along a free side of the removable keyboard to attach to a computing device surface that is adjacent to the display through suction pressure when the removable keyboard is in the closed position with the computing device.

7. The removable keyboard of claim 6, wherein the first retention cup and the second retention cup are disposed in adjacent corners of the keyboard portion such that the first retention cup and the second retention cup are to each attach to a respective adjacent corner of a top computing device surface when the removable keyboard is in the closed position with the computing device.

8. The removable keyboard of claim 6, wherein the first retention cup and the second retention cup are to each attach to a bezel of a display of the computing device when the removable keyboard is in the closed position with the computing device.

9. The removable keyboard of claim 6, wherein the first retention cup and the second retention cup are each injection molded into a keyboard deck of the keyboard portion.

10. The removable keyboard of claim 6, further comprising a track pad disposed on the keyboard portion.

11. A computer system, comprising:
a tablet computer; and
a removable keyboard to attach to an edge of the tablet computer and movable between an open position and a closed position with the tablet computer, the removable keyboard comprising:
an attachment portion engageable with the tablet computer on a hinge side of the computing device accessory, wherein the attachment portion allows the removable keyboard to be coupled and decoupled from the tablet computer;
a keyboard portion to receive user input when the removable keyboard is in the open position with the tablet computer; and
a retention cup disposed on the keyboard portion along a free side of the removable keyboard to attach to a front facing surface of the tablet computer through suction pressure, the retention cup to hold the removable keyboard in the closed position when attached to the front facing surface, wherein the retention cup includes a plurality of posts that protrude through a portion of the removable keyboard.

12. The computer system of claim 11, wherein the removable keyboard is to operably engage with the tablet computer through a communication port on the tablet computer if the removable keyboard is attached to the tablet computer.

13. The computer system of claim 11, wherein the removable keyboard is to operably engage with the tablet computer through a wireless communication protocol if the removable keyboard is attached to the tablet computer.

\* \* \* \* \*